United States Patent
Im et al.

(10) Patent No.: US 8,360,652 B2
(45) Date of Patent: Jan. 29, 2013

(54) HUB BEARING UNIT PROVIDED WITH MULTIPLE ROWS OF ROLLING ELEMENTS

(75) Inventors: Jong Soon Im, Seoul (KR); Won Rak Bae, Jecheon (KR); Ju Sang Park, Seoul (KR)

(73) Assignee: IL Jin Global Co., Ltd., Seoul (KR)

( * ) Notice: Subject to any disclaimer, the term of this patent is extended or adjusted under 35 U.S.C. 154(b) by 290 days.

(21) Appl. No.: 12/444,544

(22) PCT Filed: Oct. 10, 2007

(86) PCT No.: PCT/KR2007/004957
§ 371 (c)(1),
(2), (4) Date: Apr. 6, 2009

(87) PCT Pub. No.: WO2008/044880
PCT Pub. Date: Apr. 17, 2008

(65) Prior Publication Data
US 2010/0098365 A1 Apr. 22, 2010

(30) Foreign Application Priority Data
Oct. 10, 2006 (KR) ........................ 10-2006-0098238

(51) Int. Cl.
*F16C 33/60* (2006.01)
(52) U.S. Cl. ........................................ 384/504
(58) Field of Classification Search .......... 384/504–506, 384/513, 516, 544, 569
See application file for complete search history.

(56) References Cited

U.S. PATENT DOCUMENTS

| | | | | |
|---|---|---|---|---|
| 4,039,231 A * | 8/1977 | Di Loreto | ..................... | 384/516 |
| 4,969,754 A * | 11/1990 | Rohrer et al. | ................. | 384/512 |
| 4,993,851 A * | 2/1991 | Nakanishi | ..................... | 384/512 |
| 5,501,530 A * | 3/1996 | Nagai et al. | .................... | 384/516 |
| 7,350,977 B2 * | 4/2008 | Fukuda et al. | ................ | 384/512 |
| 7,547,147 B2 * | 6/2009 | Niebling et al. | .............. | 384/544 |
| 2006/0233478 A1 * | 10/2006 | Umeda et al. | ................. | 384/513 |
| 2007/0104404 A1 | 5/2007 | Niebling et al. | | |
| 2010/0098365 A1 * | 4/2010 | Im et al. | ....................... | 384/512 |

FOREIGN PATENT DOCUMENTS

| | | |
|---|---|---|
| WO | 93 17251 | 9/1993 |
| WO | WO 9317251 A1 * | 9/1993 |
| WO | 2005 008086 | 1/2005 |
| WO | WO 2005008086 A1 * | 1/2005 |

* cited by examiner

*Primary Examiner* — Troy Chambers
*Assistant Examiner* — Gregory Prather
(74) *Attorney, Agent, or Firm* — Michael Best & Friedrich LLP

(57) ABSTRACT

There is provided a hub bearing unit with multiple rows of rolling elements. A hub has one or more inner race surfaces. An inner ring is seated on an outer peripheral surface of the hub and has one or more inner race surfaces thereon. An outer ring is formed with outer race surfaces as many as inner race surfaces formed at the hub and the inner ring. Rolling elements are disposed between the outer race surfaces and the inner race surfaces. Cages are disposed to maintain circumferential intervals of the rolling elements. The outer ring is formed with three or more outer race surfaces. The rolling elements are arranged in three or more rows. The arrangement of multiple-row rolling elements enhances the life of the bearing. Manufacturing costs are curtailed and rolling resistance is reduced compared to the tapered roller bearing.

10 Claims, 10 Drawing Sheets

HUB BEARING UNIT PROVIDED WITH MULTIPLE ROWS OF ROLLING ELEMENTS

CROSS-REFERENCE TO RELATED APPLICATIONS

This patent application is a national stage filing under 35 U.S.C. 371 of International Application No. PCT/KR2007/004957, filed 10 Oct. 2007, and claims priority to Korean Patent Application No. 10-2006-0098238, filed 10 Oct. 2006, the entire contents of which are incorporated herein by reference.

TECHNICAL FIELD

The present invention generally relates to a hub bearing unit, and more particularly to a hub bearing unit with multiple rows of rolling elements, wherein life is enhanced due to multiple-rows rolling elements, and wherein standards for clearance and pitch circle diameter of rolling elements are established to thereby select the most proper bearing with regard to magnitude and point of action of load.

BACKGROUND ART

Bearings, which are configured to be mounted to a wheel of an automotive vehicle, may be classified into a bearing using balls as rolling elements and a bearing using tapered rollers as rolling elements according to the type of rolling elements.

FIG. 1 is a sectional view of a prior art hub bearing unit 100, which uses balls as rolling elements. The hub bearing unit 100 shown in FIG. 1 includes: a hub 110 formed with an inner race surface 113 and having a flange 111, to which a wheel (not shown) is mounted; an inner ring 120 formed with an inner race surface 121 and being mounted to one side of an outer peripheral surface 115 of the hub 110; an outer ring 130 formed with double-row outer race surfaces 131 and having a flange 133, to which a knuckle (not shown) is mounted; balls 140 (rolling elements) disposed in double rows between the inner race surfaces 113 and 121 and the outer race surface 131; a cage 150 formed with a plurality of grooves receiving the balls 140 therein for maintaining the balls 140 at constant circumferential intervals; and seals 160 fitted between the hub 110 and the outer ring 130 and between the inner ring 120 and the outer ring 130 to prevent foreign substances from entering inward and also to prevent lubricant filled inside from leaking. In FIG. 1, a reference numeral 103 denotes a bolt for securing a wheel to the hub 110. A reference numeral 111a denotes a hole, to which the bolt 103 is inserted and fixed. A reference numeral 133a denotes a hole, at which a knuckle (not shown) is joined and fixed to the flange 133.

FIG. 2 is a sectional view of a prior art hub bearing unit 200, which uses tapered rollers as rolling elements. The hub bearing unit 200 shown in FIG. 2 includes: a hub 210 formed with an inner race surface 213 and having a flange 211, to which a wheel (not shown) is mounted; an inner ring 220 formed with an inner race surface 221 and being mounted to one side of an outer peripheral surface 215 of the hub 210; an outer ring 230 formed with double-row outer race surfaces 231 and having a flange 233, to which a knuckle (not shown) is mounted; tapered rollers 240 (rolling elements) disposed in double rows between the inner race surfaces 213 and 221 and the outer race surface 231; a retainer 250 formed with a plurality of through-holes receiving the rollers 240 therein for maintaining the rollers 240 at constant circumferential intervals; and seals 260 fitted between the hub 210 and the outer ring 230 and between the inner ring 220 and the outer ring 230 to prevent foreign substances from entering inward and also to prevent lubricant filled inside from leaking. In FIG. 2, a reference numeral 203 denotes a bolt for securing a wheel to the hub 210. A reference numeral 211a denotes a hole, to which the bolt 203 is inserted and fixed. A reference numeral 233a denotes a hole, at which a knuckle (not shown) is joined and fixed to the flange 233.

When an automotive vehicle with the hub bearing unit 100, 200 mounted to its wheel travels, an axial load indicated by Fa and a longitudinal load indicated by Fr act on the hub bearing unit 100, 200, respectively. The axial load Fa is produced when the automotive vehicle turns left or right.

The hub bearing unit 100, the rolling elements of which are balls, is advantageous in that its rolling resistance is low when it works as mounted to the automotive vehicle. However, there is a problem since it can be mounted to only passenger cars or small SUVs as it has low load capability against external loads. On the contrary, the hub bearing unit 200, the rolling elements of which are tapered rollers, is advantageous in that it can support heavier loads and its life is long. However, there is a problem in that its rolling resistance and manufacturing costs are high compared to the hub bearing unit 100, which uses balls as rolling elements.

DISCLOSURE

Technical Problem

The present invention is directed to solving the foregoing problems of the prior art hub bearing units. It is an object of the present invention to provide a hub bearing unit, which has low rolling resistance and longer life and withstands heavier loads, while its manufacturing costs are comparatively inexpensive. It is a further object of the present invention to establish new design and manufacture standards for a hub bearing unit.

Technical Solution

In order to achieve the above objects, the present invention provides a hub bearing unit comprising: a hub formed with a flange having a hole for inserting a wheel securing bolt therethrough, the hub being formed with one or more inner race surfaces; an inner ring seated on an outer peripheral surface of the hub and being formed with one or more inner race surfaces; an outer ring formed with outer race surfaces as many as inner race surfaces formed at the hub and the inner ring, the outer ring having a flange formed with a hole for securing a knuckle to the flange; rolling elements disposed between the outer race surfaces formed at the outer ring and the inner race surfaces formed at the hub and the inner ring; cages disposed between the hub and the outer ring and between the inner ring and the outer ring so as to maintain circumferential intervals of the rolling elements, the cages being formed with recesses for receiving the rolling elements therein; and seals fitted to a gap between the hub and the outer ring and a gap between the inner ring and the outer ring; wherein the outer ring is formed with three or more outer race surfaces and the rolling elements are arranged in three or more rows. Another inner ring may be seated on the outer peripheral surface of the hub and the one or more inner race surfaces formed at the hub may be formed at said another inner ring.

The present invention also provides a hub bearing unit with multiple rows of rolling elements, comprising: an inner ring formed with one or more inner race surfaces; another inner ring formed with one or more inner race surfaces; an outer ring formed with outer race surfaces as many as inner race surfaces formed at the inner rings; rolling elements disposed between the outer race surfaces formed at the outer ring and the inner race surfaces formed at the inner rings; cages disposed between the inner rings and the outer ring so as to maintain circumferential intervals of the rolling elements, the cages being formed with recesses for receiving the rolling elements therein; and seals fitted to a gap between the inner rings and the outer ring; wherein the outer ring is formed with three or more outer race surfaces and the rolling elements are arranged in three or more rows.

In said hub bearing unit, when the rolling elements are disposed between the inner race surfaces and the outer race surfaces, an axial clearance of the outer rolling elements may be equal to or smaller than an axial clearance of the inner rolling elements.

Further, when the rolling elements are disposed between the inner race surfaces and the outer race surfaces, a pitch circle diameter of the inner rolling elements may be smaller than a pitch circle diameter of the outer rolling elements.

In such a case, when the rolling elements are disposed between the inner race surfaces and the outer race surfaces, an axial clearance of the outer rolling elements may be equal to or smaller than an axial clearance of the inner rolling elements.

Preferably, when the rolling elements are disposed between the inner race surfaces and the outer race surfaces, the axial clearance of the inner rolling elements may be larger by 1~20 μm than the axial clearance of the outer rolling elements.

Advantageous Effects

According to the hub bearing unit with multiple rows of rolling elements, the life of the bearing is enhanced by multiple-row arrangement of the rolling elements. Further, since standards for an axial clearance and a pitch circle diameter associated with inner rolling elements and outer rolling elements are established, bearings, which are provided with variously arranged and sized rolling elements and have optimal lives, can be selected according to wider loads ranging from small SUVs to medium-sized or large-sized trucks and positions of tire offset. In addition, manufacturing costs are curtailed and rolling resistance is reduced compared to tapered roller bearings.

BEST MODE

A hub bearing unit with multiple rows of rolling elements of the present invention will now be described in detail with reference to the accompanying drawings.

Figure 1:
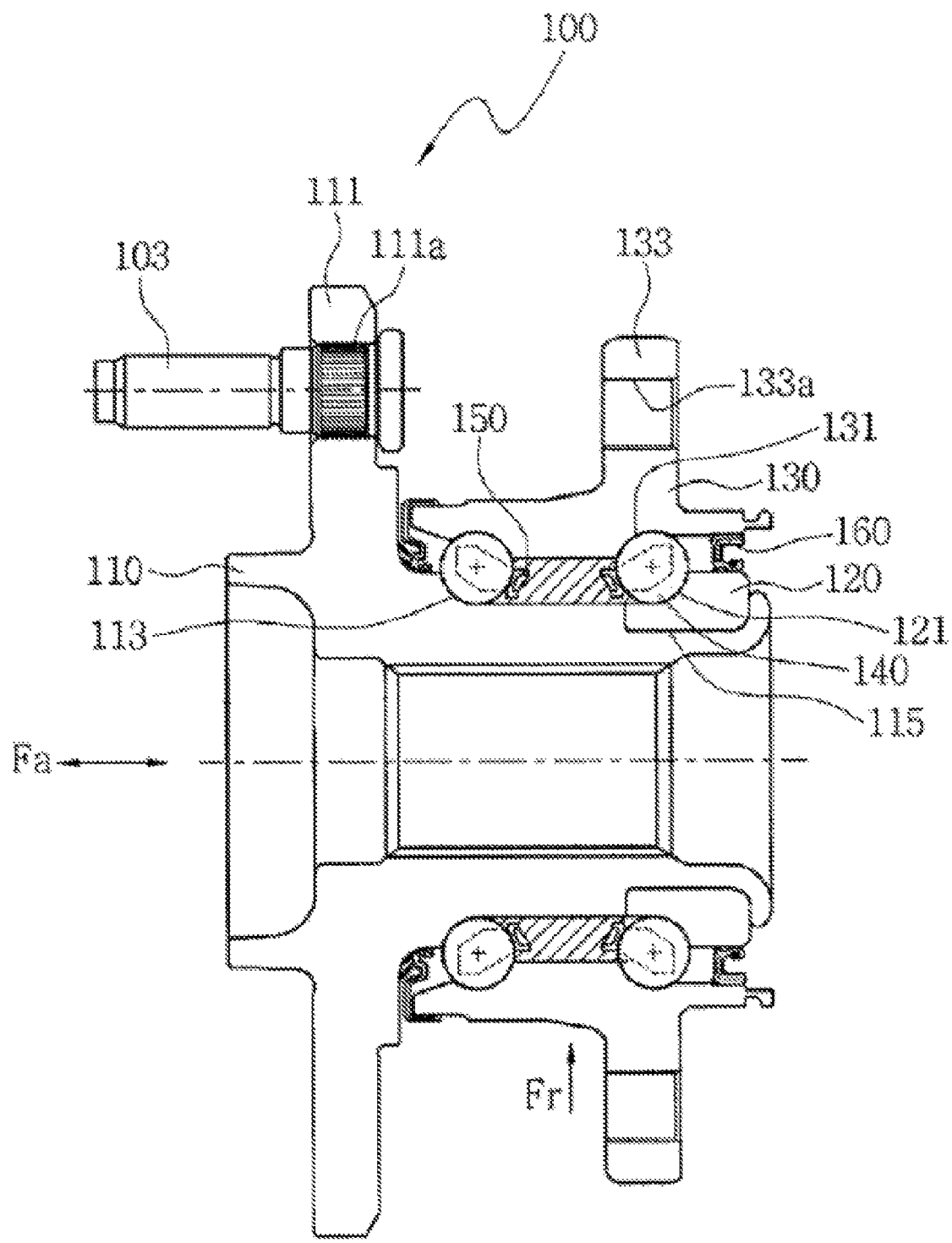
FIG. 1 is a sectional view of a prior art double-row ball bearing unit.
Figure 2:
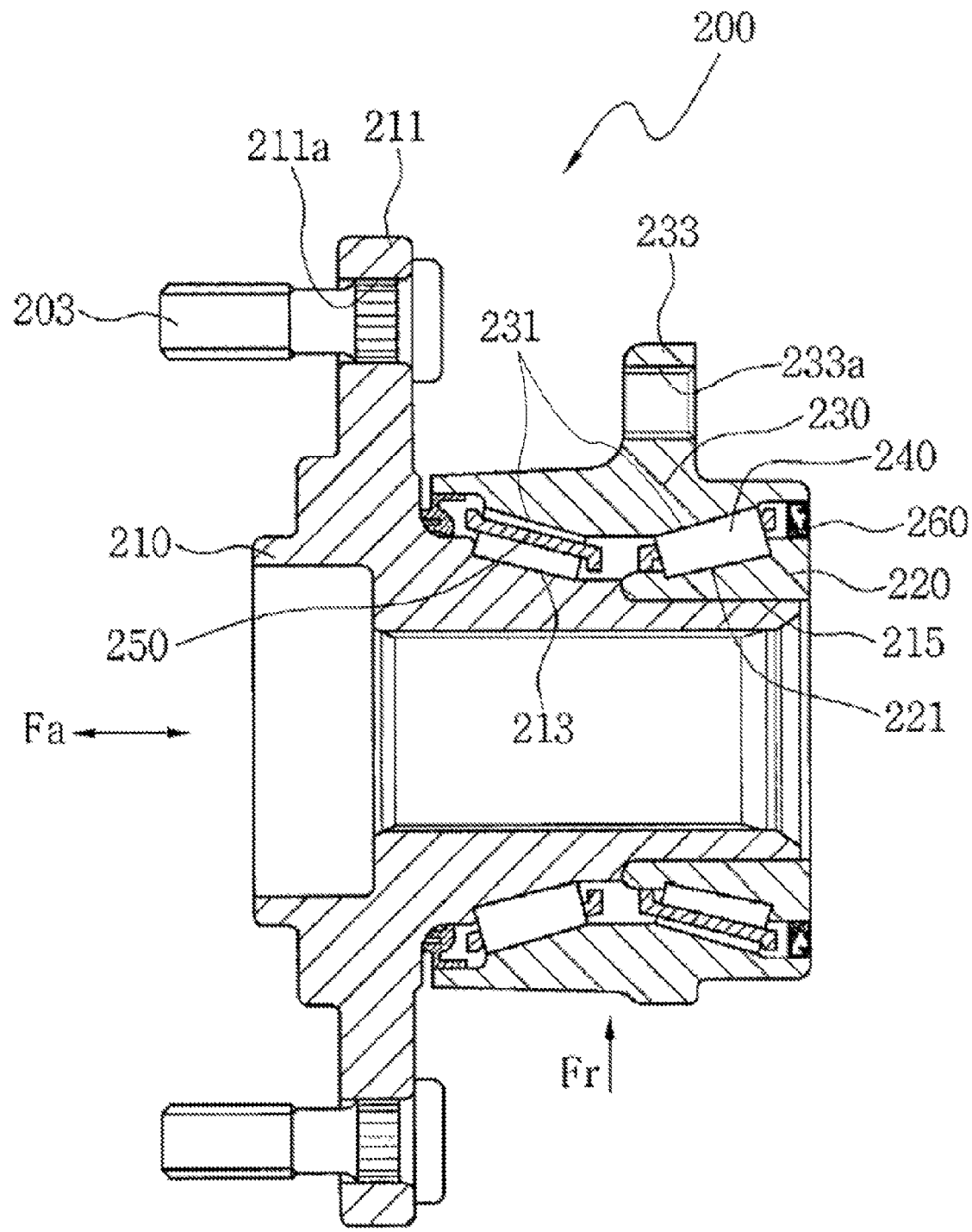
FIG. 2 is a sectional view of a prior art double-row tapered roller bearing unit.
Figure 3:
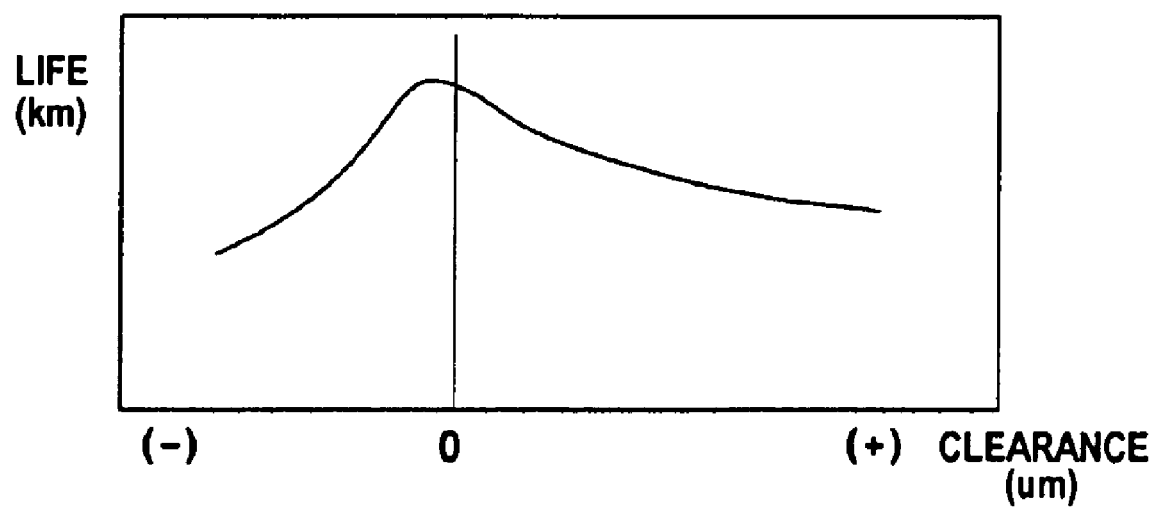
FIG. 3 is a graph schematically showing a relationship between an axial clearance and a life of a bearing.

Terminologies relating to the present invention will be described first with reference to FIGS. 3 and 4. FIG. 3 is a graph schematically illustrating a relationship between a bearing life and an axial clearance of a bearing formed between rolling elements and inner and outer rings. An axial clearance shown in a horizontal axis in FIG. 3 will be described with reference to a bearing shown in FIG. 4. The axial clearance means a half of a maximal displacement amount when an outer ring 33 is fixed in an axial direction (widthwise in FIG. 4) and a hub 10 is displaced widthwise by an external force not causing deformation of balls 40 (rolling elements).

'0' shown on the horizontal axis in FIG. 3 means a state where the rolling elements and the inner and outer rings are contacted to each other without any clearance. (−) means a state where a clearance between inner race surfaces and outer race surfaces is smaller than diameters of the balls 40 and the balls 40 are assembled between the inner race surfaces and the outer race surfaces as press-fitted therebetween. (+) means a state where there is any clearance between the balls 40 and the inner race surfaces and the outer race surfaces.

As shown in FIG. 3, a life of a bearing becomes the maximum in the (−) clearance close to '0'. However, a slope of life change is sharp in the (−) clearance. Thus, bearings are generally assembled with (+) clearance close to '0'.

Figure 4:
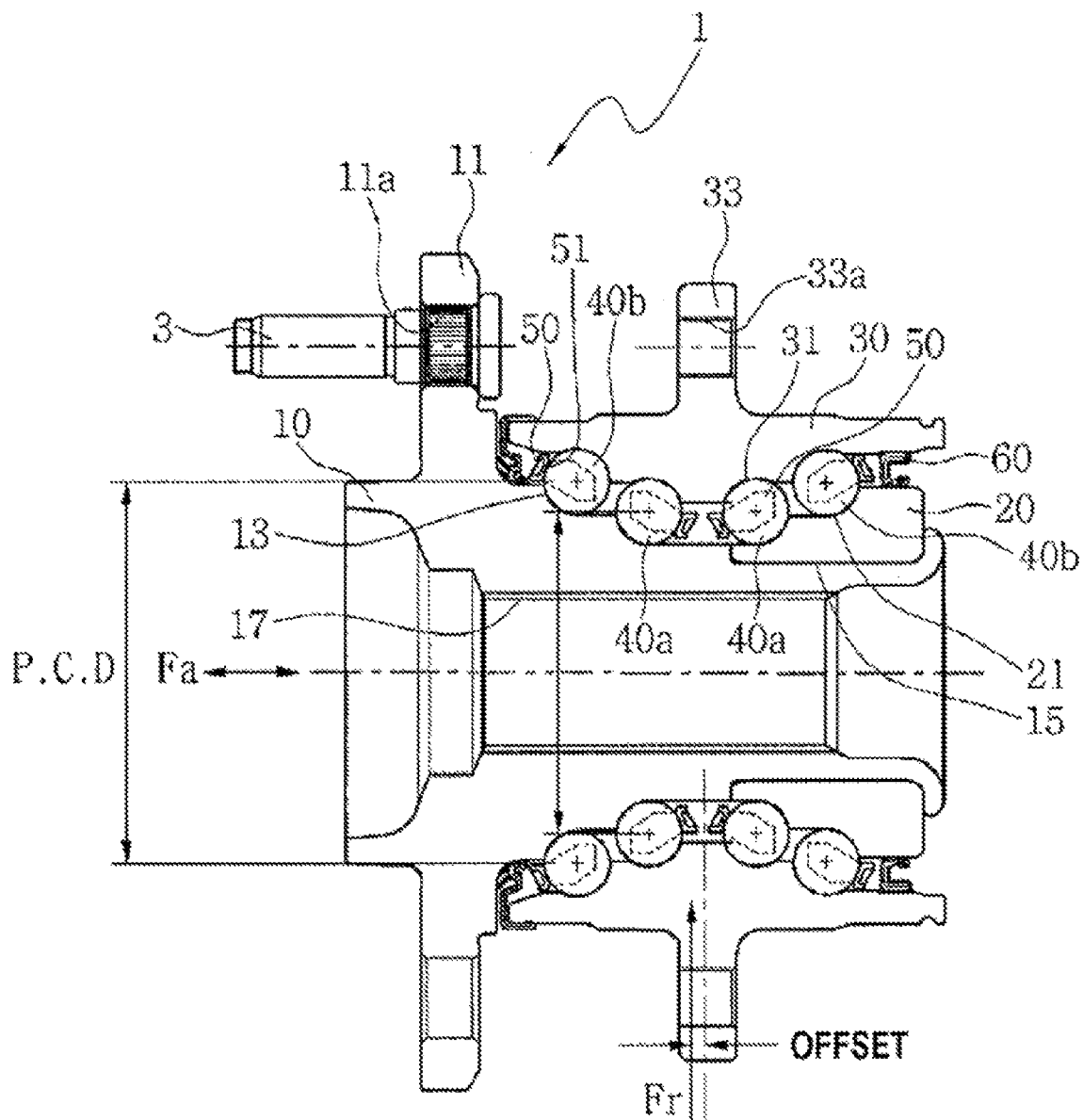
FIG. 4 is a sectional view of a hub bearing unit with multiple rows of rolling elements according to one embodiment of the present invention.

A pitch circle diameter means a diameter of a circle joining centers of balls 40a, 40b disposed in the same row when a bearing is assembled as shown in FIG. 4.

FIG. 4 is a sectional view of a hub bearing unit 1 provided with multiple rows of rolling elements according to a preferred embodiment of the present invention. FIGS. 5 to 8 are sectional views of an alternative hub bearing unit 1 with multiple rows of rolling elements according to a preferred embodiment of the present invention. FIGS. 9 and 10 are sectional views of yet another alternative hub bearing unit 1 with multiple rows of rolling elements according to a preferred embodiment of the present invention.

Figure 5:
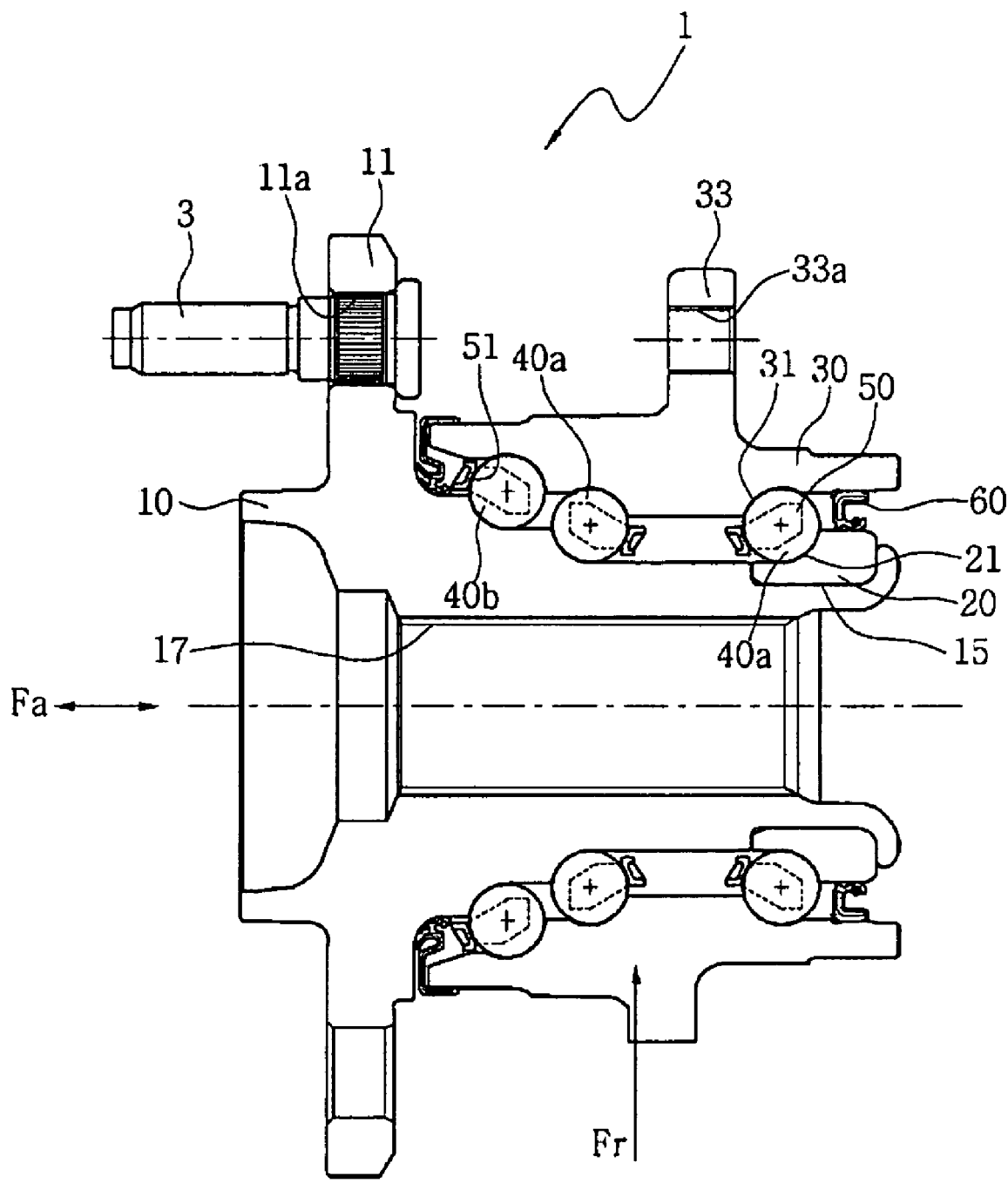
FIGS. 5 to 8 are sectional views of an alternative hub bearing unit with multiple rows of rolling elements according to one embodiment of the present invention.
Figure 6:
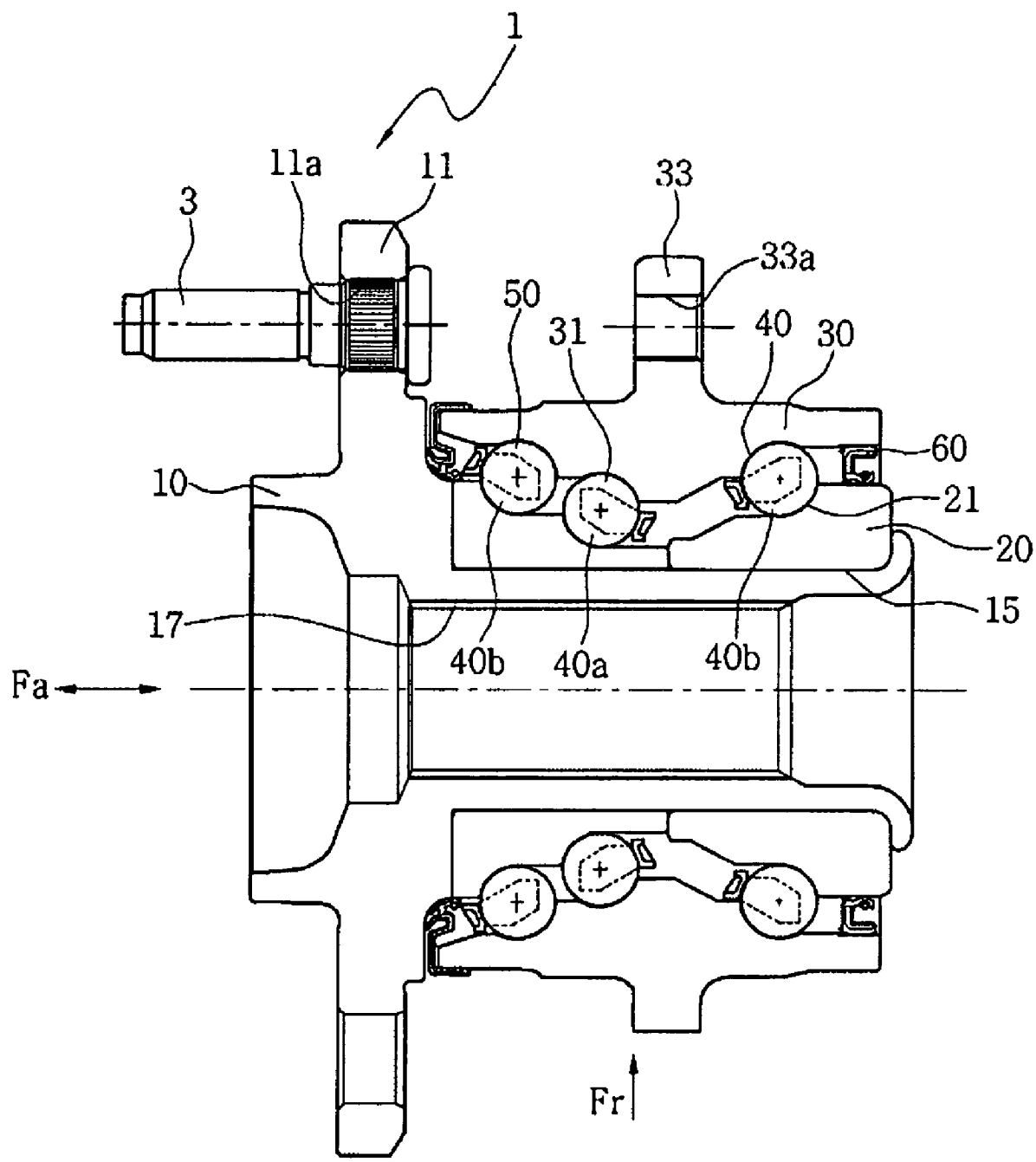
Figure 7:
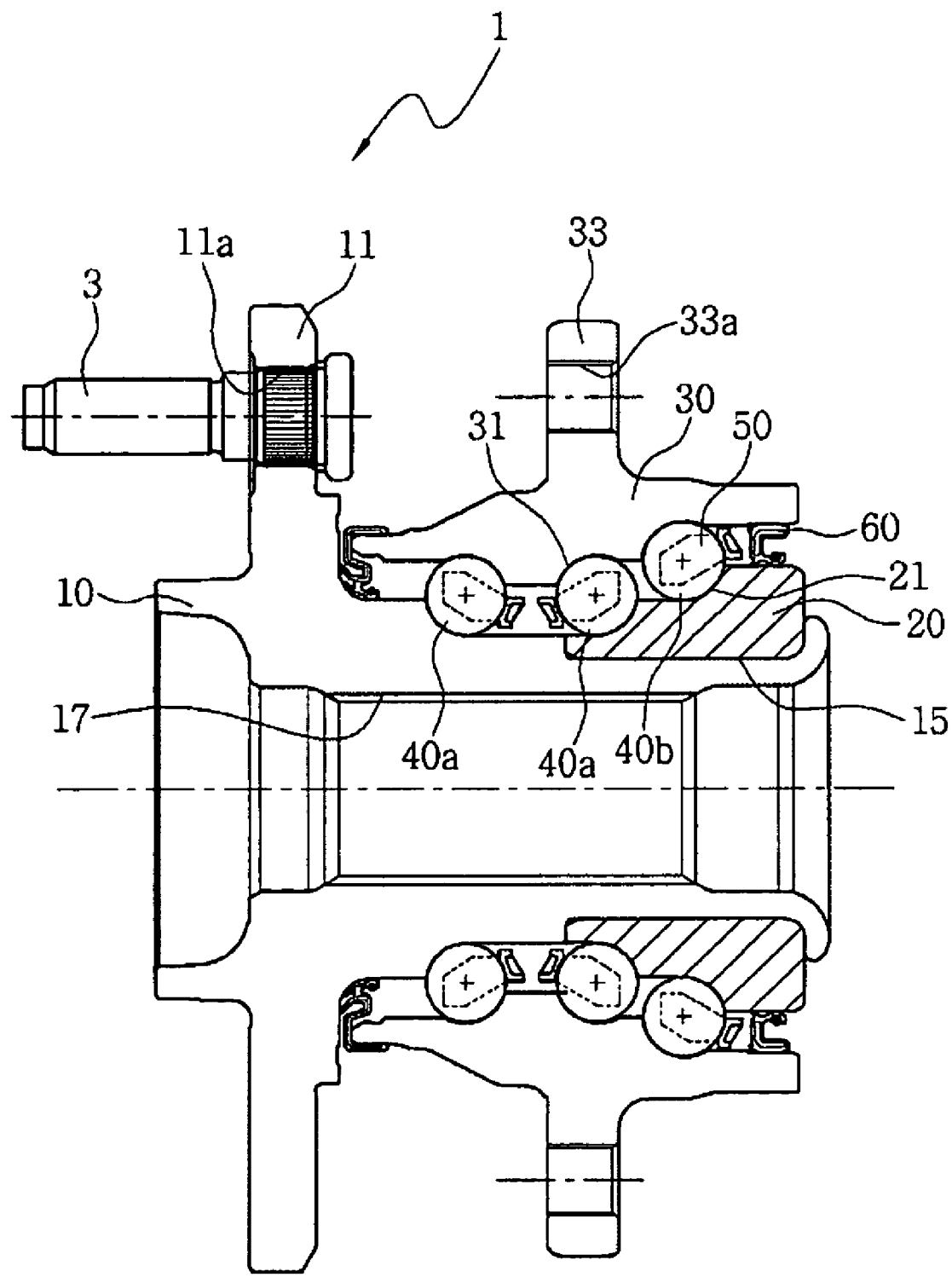
Figure 8:
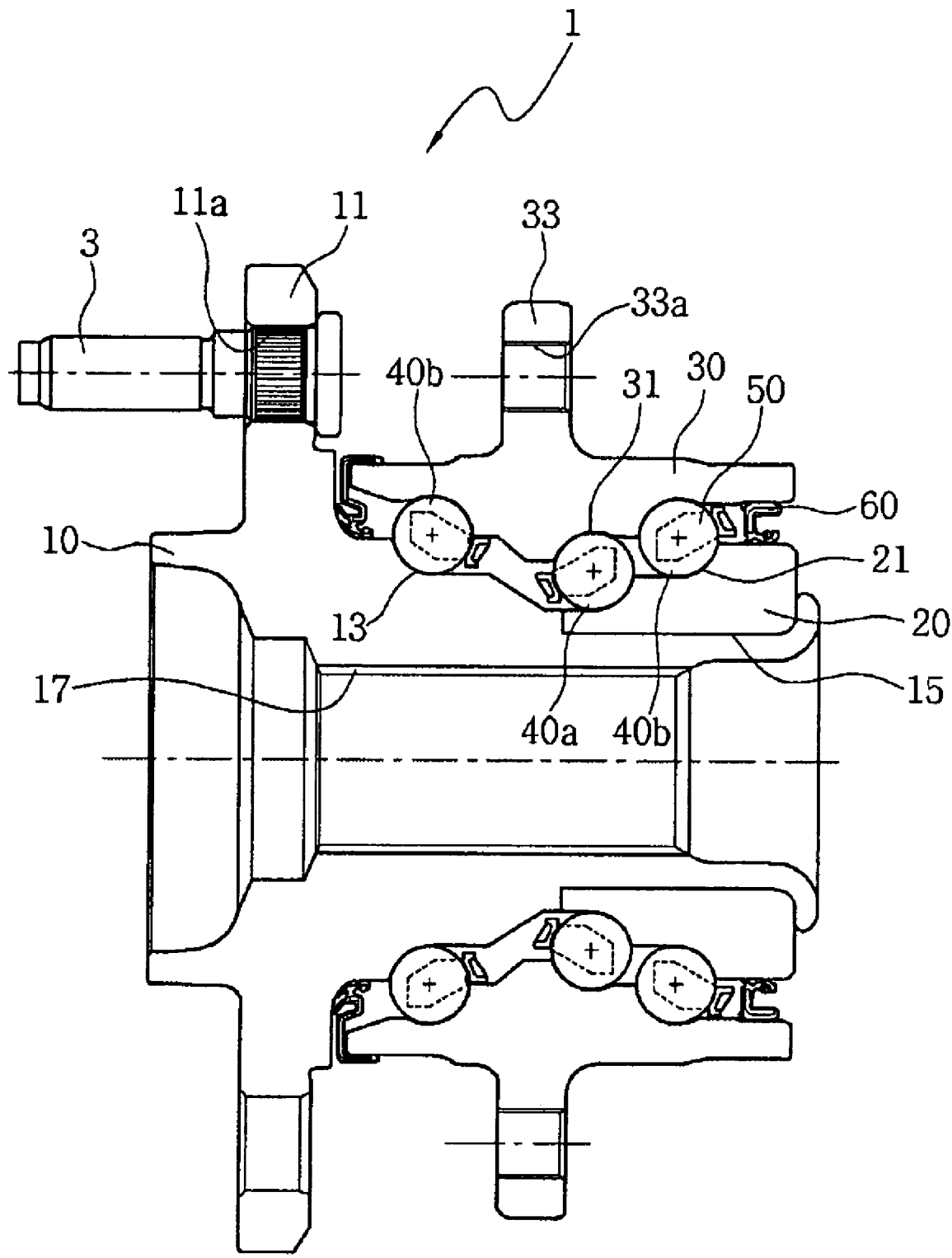
Figure 9:
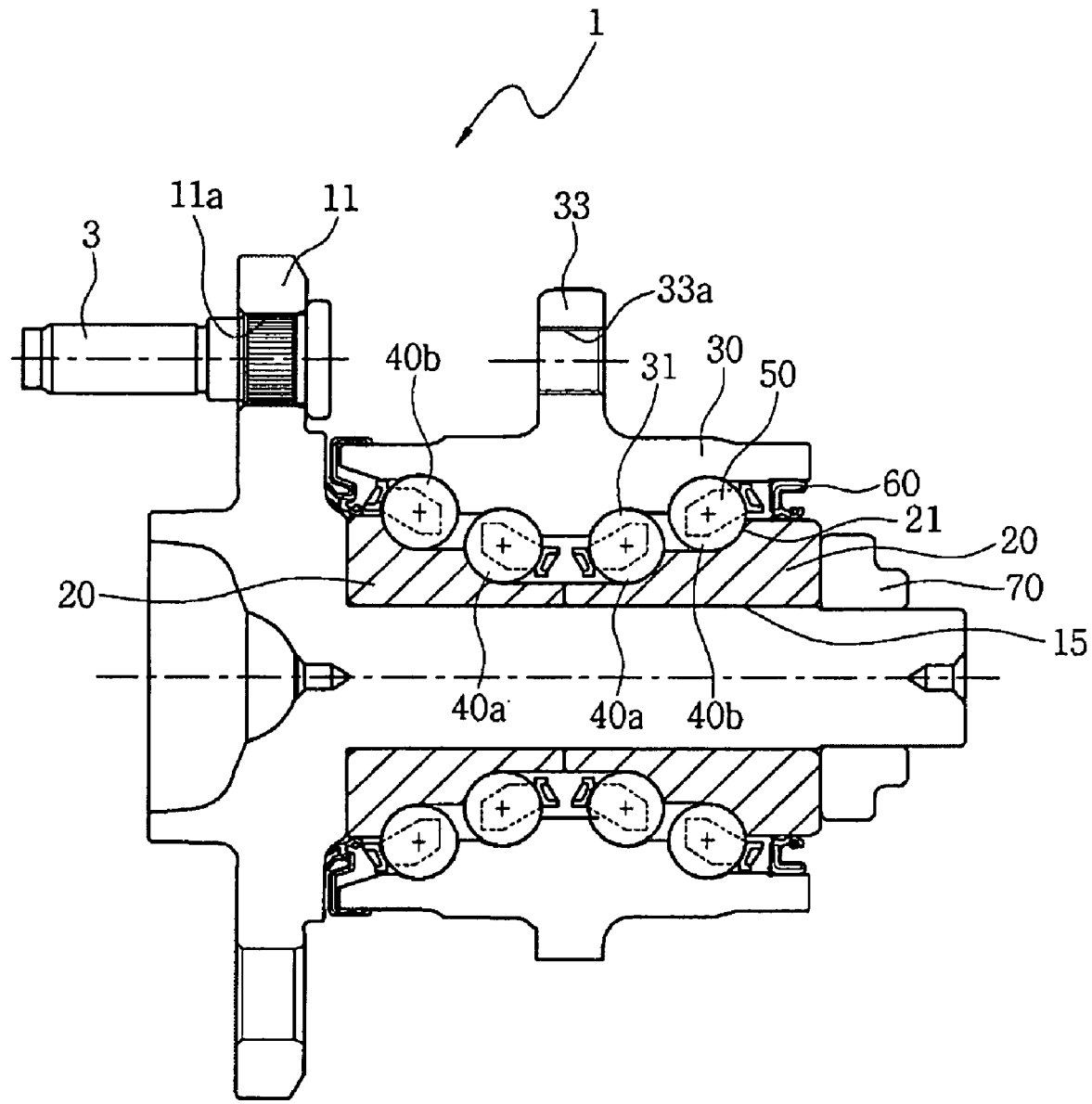
FIGS. 9 and 10 are sectional views of yet another alternative hub bearing unit with multiple rows of rolling elements according to one embodiment of the present invention.
Figure 10:
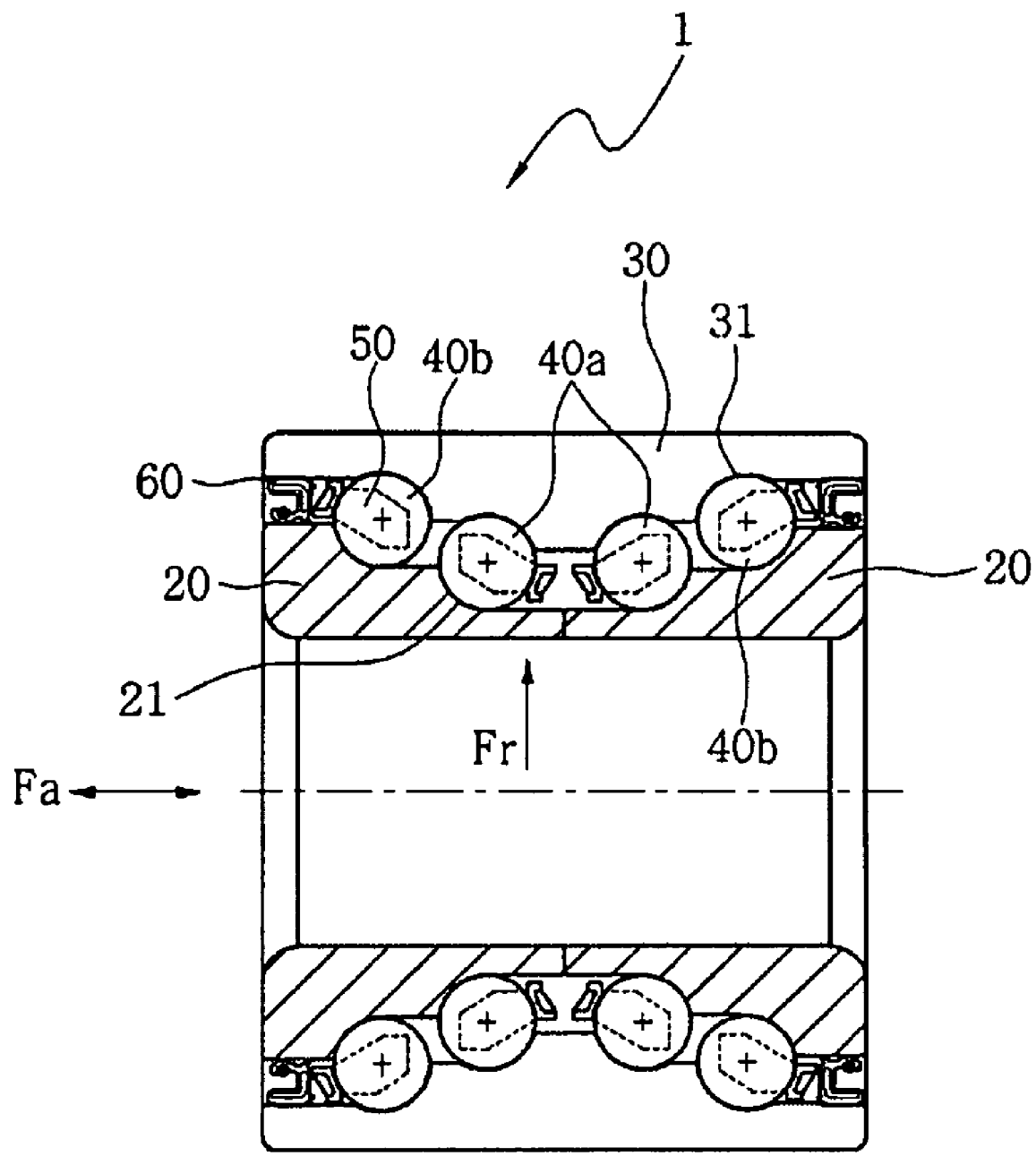

Regarding the description of the hub bearing unit 1 according to the preferred embodiment of the present invention, a left side and a right side of FIGS. 4 to 9 are referred to as a 'wheel side' and a 'vehicle side', respectively. Further, in FIGS. 4, 9 and 10, rolling elements disposed in the leftmost row and the rightmost row are referred to as 'outer rolling elements'. Further, rolling elements disposed in two rows between the outer rolling elements are referred to as 'inner rolling elements'. In FIGS. 5, 6 and 8, rolling elements disposed in the leftmost row and having a larger pitch circle diameter are referred to as 'outer rolling elements'. In FIGS. 6, 7 and 8, rolling elements disposed in the rightmost row and having a larger pitch circle diameter are referred to as 'outer rolling elements'. Also, rolling elements disposed in two right rows and having a comparatively small pitch circle diameter in FIG. 5, rolling elements disposed in one row and having a comparatively small pitch circle diameter in FIGS. 6 and 8, and rolling elements disposed in two left rows and having a comparatively small pitch circle diameter are referred to as 'inner rolling elements'.

As shown in FIGS. 4 to 9, the hub bearing unit 1 according to the preferred embodiment of the present invention comprises the following: a hub 10 formed with a flange 11 having a hole 11a for inserting a wheel securing bolt 3 therethrough, the hub being formed with one or more inner race surfaces 13; an inner ring 20 seated on an outer peripheral surface 15 of the hub 10 and being formed with one or more inner race surfaces 21; an outer ring 30 formed with outer race surfaces 31 as many as the inner race surfaces 13 and 31 formed at the hub 10 and the inner ring 20, the outer ring having a flange 33 formed with a hole 33a for securing a knuckle (not shown) to the flange; rolling elements 40a, 40b disposed between the outer race surfaces 31 formed at the outer ring 30 and the inner race surfaces 13 and 21 formed at the hub 10 and the inner ring 20; cages 50 disposed between the hub 10 and the outer ring 30 and between the inner ring 20 and the outer ring 30 so as to maintain circumferential intervals of the rolling elements 40a, 40b, the cages being formed with recesses 51 for receiving the rolling elements 40a, 40b therein; and seals 60 fitted to a gap between the hub 10 and the outer ring 30 and a gap between the inner ring 20 and the outer ring 30. The outer ring 30 is formed with three or more outer race surfaces 31. The rolling elements 40a, 40b are arranged in three or more rows.

FIGS. 4 to 8 show that the hub 10 is formed with the outer peripheral surface 15 toward the vehicle side and one inner ring 20 is mounted on the outer peripheral surface 15. As shown in FIG. 9, however, the outer peripheral surface 15 may be formed to be elongated toward the wheel side and another inner ring, which is disposed to be opposite to the inner ring 20 shown in FIGS. 4 to 8 and is formed with one or more inner race surfaces, may be mounted on said elongated outer peripheral surface 15.

In FIGS. 4 to 8, a reference numeral 17 denotes a splined inner periphery of the hub 10. An axle of a constant velocity joint is inserted into the inner periphery 17, thereby transmitting a power to a wheel (not shown) via the hub 10. The hub bearing units 1 shown in FIGS. 4 to 8 are configured to be used for a drive wheel. The hub bearing unit shown in FIG. 9 is configured to be used for a driven wheel.

In FIGS. 4 to 10, Fr denotes longitudinal load acting on the hub bearing unit 1 and Fa denotes axial load. The axial load Fa is mainly produced when an automotive vehicle with the hub bearing unit 1 mounted to its wheel travels while tuning left and right. As shown in FIG. 4, the longitudinal load generally acts on a center of the bearing unit 1. A distance between the bearing and a point of action of the longitudinal load is referred to as an offset. Thus, when the longitudinal load acts on the center of the bearing unit 1, the offset becomes '0'.

As shown in FIGS. 4, 5, 7 and 9, when the longitudinal load Fr acts between the inner rolling elements 40a, larger longitudinal load Fr and axial load Fa act on the inner rolling elements 40a rather than the outer rolling elements 40b. Thus, there is a high probability that the inner rolling elements 40a and the inner and outer race surfaces 13, 21, 31 contacted to the inner rolling elements 40a are damaged. In such a case, the inner rolling elements 40a or the inner and outer race surfaces 13, 21, 31 can be broken down to adversely affect the life of the bearing unit 1.

Accordingly, as shown in FIGS. 4, 5, 7 and 9, it is possible to enhance the life of the bearing unit 1 by offsetting the longitudinal load Fr and the axial load Fa acting on the inner rolling elements 40a by the arrangement of the outer rolling elements 40b at one or either sides of the inner rolling elements 40a. In case the point of action of the longitudinal load Fr is biased toward the wheel side (the vehicle side) as shown in FIG. 6 (FIG. 8), only the outer rolling elements may be disposed without disposing the inner rolling elements at the vehicle side (the wheel side). Disposing the outer rolling elements at the wheel side (the vehicle side) so as to offset the loads acting on the inner rolling elements sufficiently enhances the life.

As for disposing the outer rolling elements in addition to the inner rolling element as described above, in order to effectively offset an external force caused by the longitudinal load Fr and an external force caused by the axial load Fa, which act near the inner rolling elements 40a, it is preferable that an axial clearance of the outer rolling elements 40b is equal to or smaller than that of the inner rolling elements 40a.

In case the axial clearance of the outer rolling elements 40b is still larger than that of the inner rolling elements 40a, the loads acting on the outer rolling elements 40b is excessively increased over the loads acting on the inner rolling elements 40a, thereby causing a problem since the life of the outer rolling elements 40b or the life of the inner race surface 13 or the outer race surface 31 contacted to the outer rolling elements 40b is rather shortened.

On the other hand, in case the axial clearance of the outer rolling elements 40b is larger than that of the inner rolling elements 40a, the external forces acting on the inner rolling elements 40a, which are caused by the longitudinal load Fr and the axial load Fa, cannot be effectively offset. Thus, it cannot prevent the life of the inner race surfaces 13, 21 or the outer race surface 31 contacted to the inner rolling element 40a and the outer rolling elements 40b from being shortened.

Accordingly, it is preferable that the axial clearance of the inner rolling elements 40a is equal to or larger than the axial clearance of the outer rolling elements 40b, as described above. When the clearance is as such, it is preferable that the axial clearance of the inner rolling elements 40a is larger by 1~20 μm than the axial clearance of the outer rolling elements 40b.

When the axial clearance of the outer rolling elements 40b is smaller than that of the inner rolling elements 40a, if the outer ring 33 is fixed and the hub 10 is moved to the right by the load not causing the deformation of the rolling elements 40a and 40b in FIG. 4, the outer rolling elements 40b of the wheel side is first contacted to the inner race surface 13 and the outer race surface 31. In such a state where the outer rolling elements 40b of the wheel side are contacted to the inner race surface 13 and the outer race surface 31 as described above, a clearance having a predetermined range is maintained between the inner rolling elements 40a of the wheel side and the inner race surface 13 and the outer race surface 31.

In addition, it is preferable to enhance the load capability against the external forces of the outer rolling elements 40b by making the pitch circle diameter of the outer rolling elements 40b larger than that of the inner rolling elements 40a.

Since the axial clearance of the outer rolling elements 40b is equal to or smaller than the axial clearance of the inner rolling elements 40a and the pitch circle diameter of the outer rolling elements is larger than the pitch circle diameter of the inner rolling elements 40a as described above, the external forces caused by the longitudinal load Fr or the axial load Fa, which act near the inner rolling elements 40a, can be effectively offset and the lives of the outer side and the inner side can become nearly the same.

FIG. 10 shows another application of the hub bearing unit 1, which is comprised of two inner rings and one outer ring. Detailed descriptions relating thereto are similar to the foregoing descriptions and are thus omitted herein.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The wheel bearing unit of the present invention can be applied to the wheels of various automotive vehicles from small-sized SUVs to medium- and large-sized trucks.

The invention claimed is:
1. A hub bearing unit comprising:
   a hub formed with a flange having a hole for inserting a wheel securing bolt therethrough, the hub being formed with one or more inner race surfaces;

an inner ring seated on an outer peripheral surface of the hub and being formed with one or more inner race surfaces;

an outer ring formed with outer race surfaces as many as inner race surfaces formed at the hub and the inner ring, the outer ring having a flange formed with a hole for securing a knuckle to the flange;

a plurality of rolling elements positioned in multiple rows including first, second, and third rows of rolling elements encircling the hub and each having a respective pitch circle diameter, wherein the first row of rolling elements is located at an axial position between the second and third rows of rolling elements, and wherein the pitch circle diameter of the first row of rolling elements is smaller than the pitch circle diameter of at least one of the second and third rows of rolling elements, the rolling elements of the first, second, and third rows of rolling elements disposed between the outer race surfaces formed at the outer ring and the inner race surfaces formed at the hub and the inner ring, where an axial clearance of the rolling elements of the second and third rows is smaller than an axial clearance of the rolling elements of the first row to offset a longitudinal load and an axial load acting on the rolling elements;

a fourth row of rolling elements encircling the hub and located axially between the first and second rows, wherein when the fourth row of rolling elements is disposed between the inner race surfaces and the outer race surfaces, an axial clearance of the rolling elements of the second and third rows of rolling elements is smaller than an axial clearance of the rolling elements of the fourth row;

cages disposed between the hub and the outer ring and between the inner ring and the outer ring so as to maintain circumferential intervals of the rolling elements of the first, second, and third rows, the cages being formed with recesses for receiving the rolling elements of the first, second, and third rows therein; and seals fitted to a gap between the hub and the outer ring and a gap between the inner ring and the outer ring;

wherein the outer ring is formed with three or more outer race surfaces and the rolling elements of the first, second, and third rows are arranged therein, and wherein the axial clearance is defined as a half of a maximal displacement amount created when the outer ring is fixed in an axial direction and the hub is displaced widthwise by an external force not causing deformation of the rolling elements.

2. A hub bearing unit comprising:

an inner ring formed with one or more inner race surfaces;

another inner ring formed with one or more inner race surfaces;

an outer ring formed with outer race surfaces as many as inner race surfaces formed at the inner rings;

a plurality of outer and inner rolling elements positioned in multiple rows including first, second, and third rows of rolling elements encircling the hub and each having a respective pitch circle diameter, wherein the first row of rolling elements is located at an axial position between the second and third rows of rolling elements, and wherein the pitch circle diameter of the first row of rolling elements is smaller than the pitch circle diameter of at least one of the second and third rows of rolling elements, the rolling elements of the first, second, and third rows of rolling elements disposed between the outer race surfaces formed at the outer ring and the inner race surfaces formed at the inner rings, where an axial clearance of the rolling elements of the second and third rows is smaller than an axial clearance of the rolling elements of the first row to offset a longitudinal load and an axial load acting on the rolling elements;

a fourth row of rolling elements encircling the hub and located axially between the first and second rows, wherein when the rolling elements are disposed between the inner race surfaces and the outer race surfaces, an axial clearance of the rolling elements of the first and fourth rows of rolling elements is larger than an axial clearance of the rolling elements of the second and third rows;

cages disposed between the inner rings and the outer ring so as to maintain circumferential intervals of the rolling elements of the first, second, and third rows, the cages being formed with recesses for receiving the rolling elements of the first, second, and third rows therein; and seals fitted to a gap between the inner rings and the outer ring;

wherein the outer ring is formed with three or more outer race surfaces and the rolling elements of the first, second, and third rows are arranged therein, and wherein the axial clearance is defined as a half of a maximal displacement amount created when the outer ring is fixed in an axial direction and the hub is displaced widthwise by an external force not causing deformation of the rolling elements.

3. The hub bearing unit of claim 1, wherein another inner ring is seated on the outer peripheral surface of the hub and the one or more inner race surfaces formed at the hub are formed at said another inner ring.

4. The hub bearing unit of claim 1, wherein when the rolling elements are disposed between the inner race surfaces and the outer race surfaces, the pitch circle diameter of the rolling elements of the first row is smaller than the pitch circle diameter of the rolling elements of the second and third rows.

5. The hub bearing unit of claim 4, wherein the axial clearances of the rolling elements of the first and fourth rows of rolling elements is larger than the axial clearances of the rolling elements of the second and third rows.

6. The hub bearing unit of claim 5, wherein when the rolling elements are disposed between the inner race surfaces and the outer race surfaces, the axial clearance of the rolling elements of the first row is larger by 1~20 µm than the axial clearance of the rolling elements of the second and third rows.

7. The hub bearing unit of claim 2, wherein when the rolling elements are disposed between the inner race surfaces and the outer race surfaces, the pitch circle diameter of the rolling elements of the first row is smaller than the pitch circle diameter of the rolling elements of the second and third rows.

8. The hub bearing unit of claim 5, wherein when the rolling elements are disposed between the inner race surfaces and the outer race surfaces, a pitch circle diameter of the rolling elements of the fourth row is smaller than the pitch circle diameters of the rolling elements of the second and third rows.

9. The hub bearing unit of claim 7, wherein when the rolling elements are disposed between the inner race surfaces and the outer race surfaces, the axial clearance of the rolling elements of the first and fourth rows is larger by 1~20 µm than the axial clearance of the rolling elements of the second and third rows.

10. The hub bearing unit of claim 8, wherein when the rolling elements are disposed between the inner race surfaces and the outer race surfaces, the axial clearance of the rolling elements of the first and fourth rows is larger by 1~20 µm than the axial clearance of the rolling elements of the second and third rows.

* * * * *

UNITED STATES PATENT AND TRADEMARK OFFICE
CERTIFICATE OF CORRECTION

PATENT NO.        : 8,360,652 B2
APPLICATION NO.   : 12/444544
DATED             : January 29, 2013
INVENTOR(S)       : Im et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 351 days.

Signed and Sealed this
First Day of September, 2015

Michelle K. Lee
*Director of the United States Patent and Trademark Office*